United States Patent [19]
Miller

[11] 3,735,638
[45] May 29, 1973

[54] LIQUID LEVEL MEASUREMENT DEVICE

[76] Inventor: Bernard J. Miller, Andorra Road, Lafayette Hill, Pa.

[22] Filed: Feb. 1, 1971

[21] Appl. No.: 111,311

[52] U.S. Cl. ............................................. 73/304 R
[51] Int. Cl. ............................................. G01f 23/24
[58] Field of Search ........................... 73/304 R, 301; 338/38; 340/244 C

[56] References Cited

UNITED STATES PATENTS

| | | | |
|---|---|---|---|
| 1,977,898 | 10/1934 | Seniff | 340/244 |
| 2,797,284 | 6/1957 | Brooke | 73/304 R |

FOREIGN PATENTS OR APPLICATIONS

| | | | |
|---|---|---|---|
| 636,545 | 2/1962 | Canada | 73/304 R |

Primary Examiner—S. Clement Swisher
Assistant Examiner—Denis E. Corr
Attorney—Alan H. Bernstein

[57] ABSTRACT

A liquid level measurement device relying upon the principle of a resistance bridge wherein the height sensing means is one resistor of the bridge. The height sensing resistor is comprised of a fine wire extending from the bridge circuit to a grounding rod. The fine wire extends generally parallel to, but spaced from, the grounding rod in order to constitute the height sensor. In use, the height sensor is inserted in the liquid whose height is to be measured in such a way that the grounding rod and the fine wire extend generally perpendicular to the liquid level line. Thus, the aqueous ionic media whose height is being measured will short out that portion of the fine wire below the liquid level to decrease the effective resistance of the height sensor. This has the effect of unbalancing the bridge circuit to give a reading on a meter that is an indication of the height of the liquid.

3 Claims, 6 Drawing Figures

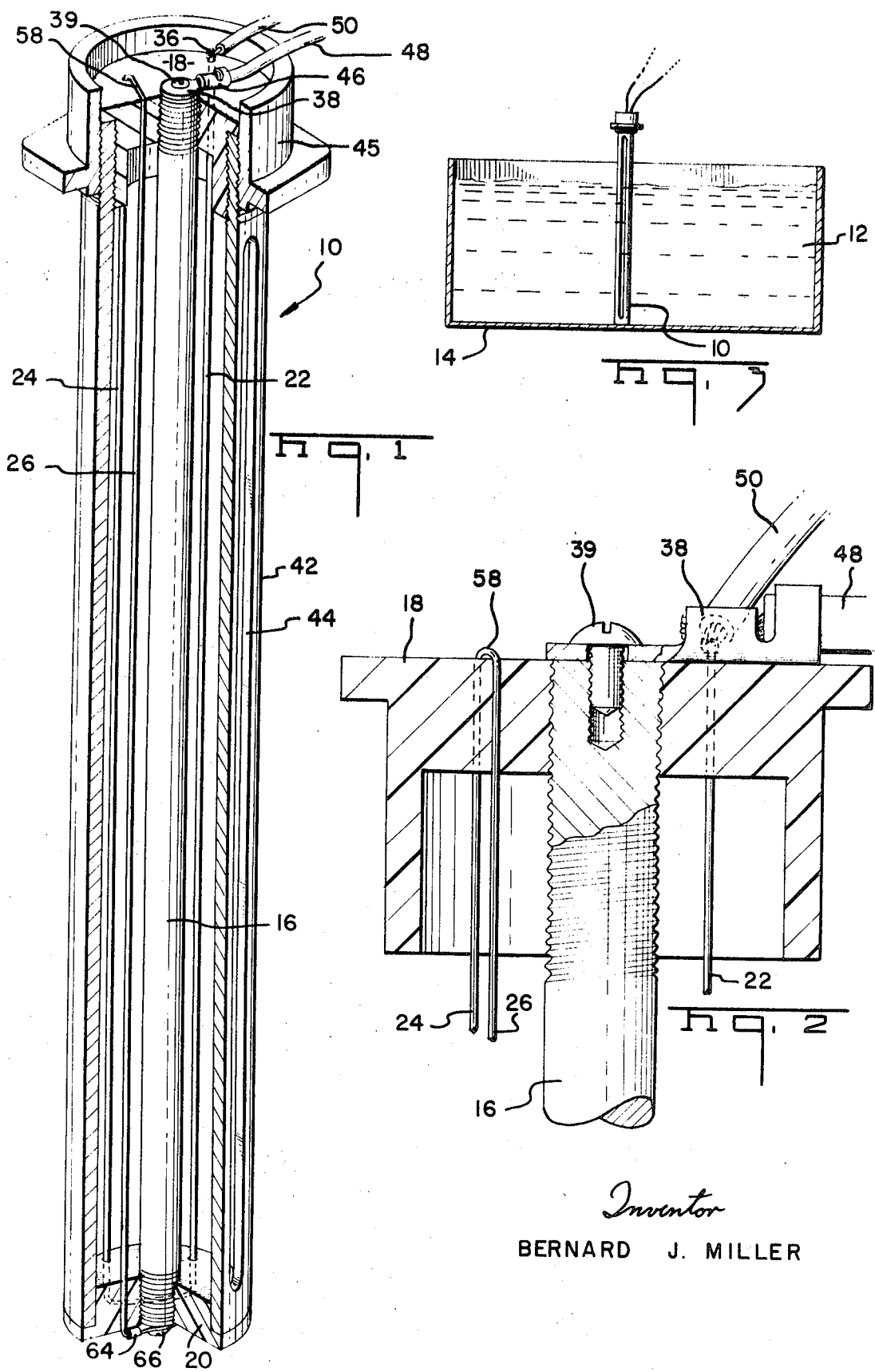

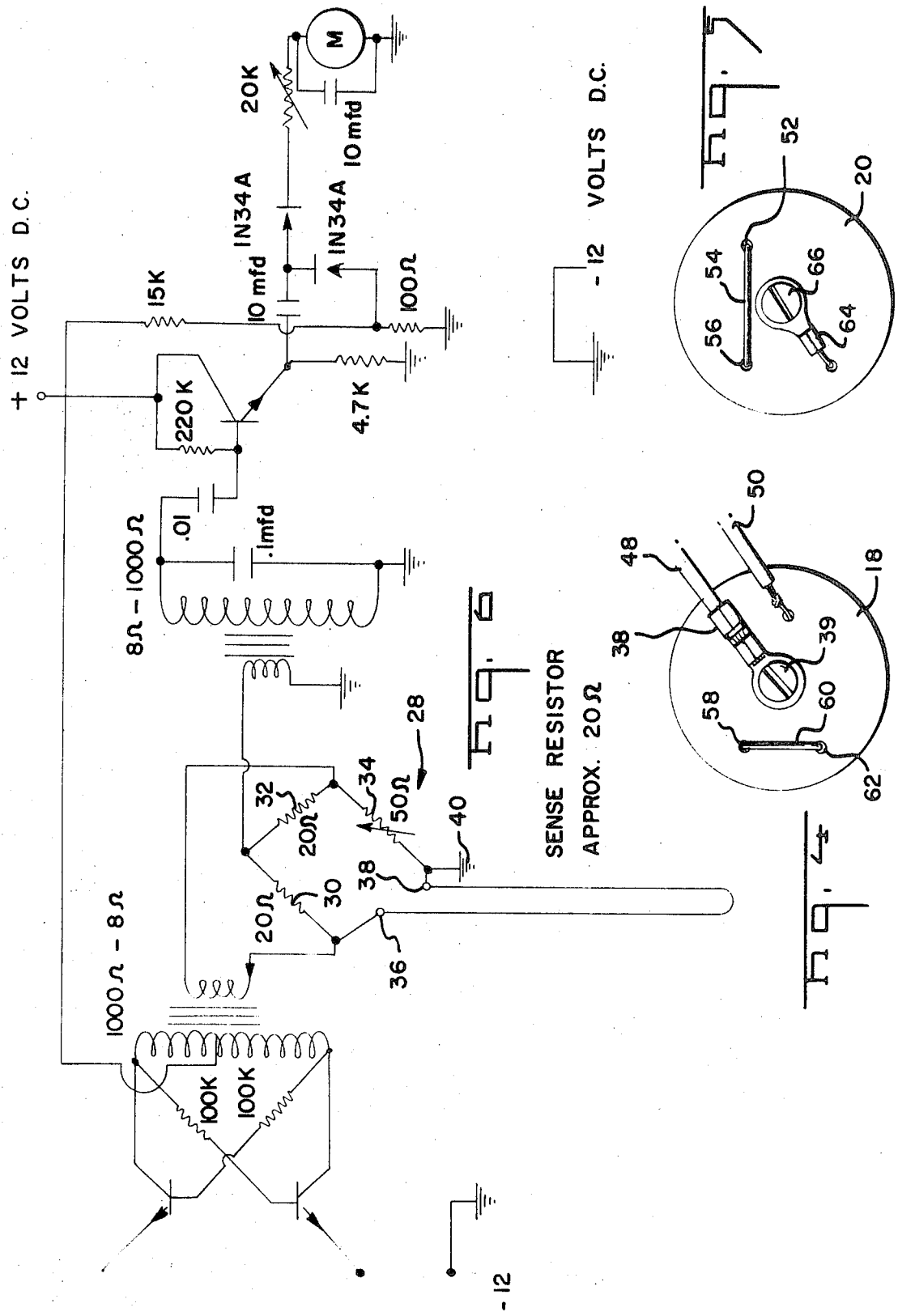

LIQUID LEVEL MEASUREMENT DEVICE

This invention relates to a liquid level measurement device and has as its objective the provision of a new and improved device of this general class. There are a large variety of liquid level measurement devices on the market and in the patent literature that are suited to measure the level of a wide range of liquids under varying conditions. Nevertheless, these devices have certain limitations upon their use of cost considerations enter to limit the practical usefulness of such devices.

Many of the prior measurement devices must be of a length greater than the column of liquid being measured in order to monitor intermediate liquid levels. Furthermore, these devices become fouled sooner or later by the liquid that is being measured.

It is accordingly an object of the invention to provide a liquid level measurement device which theoretically can measure a column of liquid of infinite length and which resists the fouling tendencies of the liquid that is being measured.

Yet another object of the present invention is to provide a liquid level measurement device that is of relatively low cost in manufacture as well as of low cost in use while producing an amazingly accurate but linear measure.

The foregoing as well as other objects of the invention are achieved by providing a liquid level measurement device that functions as one resistor in a resistance bridge, with the device including height sensing means comprised of at least one fine wire that extends from the bridge circuit to a grounding rod to constitute a height sensor. The fine wire extends generally perpendicular to the liquid level being measured. Where the liquid is an aqueous ionic media, it will have the effect of shorting out the portion of the fine wire below the liquid level and thereby unbalance the bridge to give a reading on a meter which is an indicator of liquid level. It is preferable that a fine wire be utilized as the height sensor since it will prohibit the formation of droplets and thus retard the formation of any film on the wire, which film would have the effect of introducing an error in the liquid level measurement. In the practice of the invention, AC current flows in the resistance bridge which is, however, DC isolated in order to avoid unwanted polarization in a marine atmosphere as well as eliminating a tendency to produce an erroneous reading by way of polarization.

Other objects and many of the attendant advantages of the invention will become more readily appreciated by reference to the accompanying drawings wherein:

FIG. 1 is a three-dimensional view (with certain portions removed for the sake of clarity) showing the liquid level measuring device constituting a first embodiment of the invention;

FIG. 2 is an enlarged sectional view taken through the upper portion of the device of FIG. 1;

FIG. 3 is a view showing the device of FIG. 1 in use;

FIG. 4 is a top plan view of the upper plug that is used in the device of the present invention;

FIG. 5 is a bottom plan view showing the lower plug that is used in the device of the present invention; and FIG. 6 is a view showing circuitry that is utilized with the present invention.

Referring now in greater detail to the various figures of the drawing wherein like reference characters refer to like parts there is shown generally at 10 a liquid level measurement device embodying the present invention. As shown in FIG. 3 the device 10 may be used to measure an aqueous ionic media 12 that would be contained in a tank 14, although the invention is quite versatile in the sense that it can measure liquid levels in dynamic as well as static systems. A particular use of the invention is in a marine environment, such as for use in measuring the level of the bilge or detecting the presence of liquid in the raw water pump line. Another preferred use of the device of the present invention is in the sewage area in connection with holding tanks for boats or even for use in general sewer lines.

With reference to FIG. 1 it will be seen that the device 10 basically comprises a central grounding rod 16 which also provides structural support. The rod 16 extends between upper plug 18 and lower plug 20 that are of an insulating material. A fine wire, which constitutes the height sensor, extends between the plugs 18 and 20 in fine wire sections 22, 24 and 26. However, it will be appreciated that only one pass of wire may be necessary to practice the invention although the three passes of the fine wire are utilized to achieve a nearly linear response.

With reference to the circuit diagram of FIG. 6 it will be seen that the liquid level measurement device 10 functions as one resistor in resistance bridge 28 which also includes resistors 30, 32 and 34. It will be seen that one terminal 36 of the device 10 is connected back towards resistor 30 whereas the other terminal 38 of the device 10 is connected to ground 40. The reference characters 36 and 38 are reproduced on FIG. 1 in order to show the foregoing connections.

With further reference to FIG. 1 it will be seen that the device includes an outer protective shell 40 which may be of plastic or corrosion-resistance metal. The sheath 42 includes appropriate openings to allow liquid access to the fine wire sections 22, 24 and 26 and to the grounding rod 16. It will be appreciated that when the aqueous ionic liquid being measured bridges the gap between any of the fine wire sections and the grounding rod that the overall resistance of the sensing probe 10 is decreased and this will have the effect of unbalancing the bridge circuit 28. A meter is utilized to report the unbalance.

Secured at the top of the sheath 42 is a collar 44 that is appropriately threaded to receive upper plug 18. It will be seen that the upper plug 18 includes a central threaded opening that receives the upper end of grounding rod 16.

The lower end of the grounding rod 16 is also threaded in a central opening in the lower plug 20. The upper end of the grounding rod 16 is connected to ground through terminal 38 by means of ferrule 46 and wire 48. The fine wire is connected to a resistor of the bridge circuit 28 by means of cable 50 with a solder connection being made to the fine wire at the top of plug 18 in order to constitute terminal 36 of the liquid level measurement device 10.

It will be seen from FIG. 1 that fine wire section 22 proceeds downwardly from terminal 36 through an appropriate opening in upper plug 18. The fine wire section 22 ultimately reaches bottom plug 20 and passes through an opening 52 (FIG. 5) in bottom plug 20. The fine wire section 22 then passes in a short run 54 (FIG. 5) against the bottom of lower plug 20 to opening 56 in the plug 20. The fine wire section 24 then commences as it runs from lower plug 20 to upper plug 18.

The fine wire section 24 passes through opening 58 in the upper plug 18 (FIG. 4) and then crosses the upper surface of the plug 18 in short run 60. The fine wire then passes through opening 62 in the upper plug 18 and then fine wire run 26 begins. This extends from the upper plug to the lower plug with the fine wire run 26 terminating at ferrule 64 that is connected to the grounding rod 18 by means of bolt 66 (FIG. 5).

It will thus be appreciated that any bridging of any gap between any fine wire section and the grounding rod will have the effect of decreasing the effective resistance of the liquid level measurement device 10 so long as an aqueous ionic liquid is involved.

It is preferred that the fine wire be of a 28 gauge since any finer gauge may lack the requisite strength and thereby shorten the useful life of the device. In some instances the fine wire may be a bit heavier, but it is preferred that the fine wire be no heavier than 22 gauge since with heavier wire there is a tendency to retain droplets and this in turn will ultimately lead to the creation of a film. It is to be understood, however, that still heavier wire may be utilized where the film forming tendency can be tolerated, and that the broader aspects of the invention encompass a heavier wire so long as the resistance bridge principle is relied upon.

FIG. 6 shows circuitry that may be utilized in connection with the present invention including AC excitation provided by a multivibrator oscilator, with the AC being rectified to DC and an appropriate DC current established. It is preferred that the resistors in resistance bridge 28 be of a value of 20 ohms each and that the current within the bridge should not exceed 60 microamps.

It is preferred that the fine wire range in size from 28 to 20 gauge (0.0126 inches to 0.032 inches) although other sizes will yield satisfactory results, although the response time will be longer with heavier wires. All transistors are N P N (GE 10).

Without further elaboration, the foregoing will so fully illustrate my invention, that others may, by applying current or future knowlege, adapt the same for use under various conditions of service.

What is claimed as the invention is:

1. A liquid level measurement device for a liquid medium having film creation tendencies, said device comprising a balancing circuit, a non-film forming fine wire of the resistance type constituting one resistor in said balancing circuit, there being three additional resistors in said circuit to make a four resistor bridge balancing circuit, a grounding rod, said fine wire running parallel to said grounding rod and being spaced from said grounding rod by a gap, said fine wire having a diameter of from 0.0126 inches to 0.032 inches so as to resist the formation of droplets thereon to prevent film formation from said liquid medium whereby said liquid bridges said gap between said fine wire and said grounding rod to short out the resistance of said wire below liquid level and to provide an unbalancing effect in said bridge circuit, and meter means to measure said unbalancing effect.

2. The device of claim 1 wherein said liquid medium is sewage.

3. The device of claim 1 wherein there are three passes of said fine wire.

* * * * *